United States Patent
Yamada (10) Patent No.: US 10,615,660 B1
(45) Date of Patent: Apr. 7, 2020

(54) MOTOR AND DISK DRIVE

(71) Applicant: Nidec Corporation, Kyoto (JP)

(72) Inventor: Hiroki Yamada, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/533,832

(22) Filed: Aug. 7, 2019

(30) Foreign Application Priority Data

Sep. 27, 2018 (JP) .................. 2018-181410

(51) Int. Cl.
| | |
|---|---|
| *G11B 33/14* | (2006.01) |
| *H02K 5/10* | (2006.01) |
| *H02K 3/52* | (2006.01) |
| *H02K 7/08* | (2006.01) |
| *G11B 19/20* | (2006.01) |
| *G11B 5/012* | (2006.01) |
| *H02K 21/22* | (2006.01) |

(52) U.S. Cl.
CPC ............... *H02K 5/10* (2013.01); *G11B 5/012* (2013.01); *G11B 19/2009* (2013.01); *G11B 33/14* (2013.01); *H02K 3/522* (2013.01); *H02K 7/088* (2013.01); *H02K 21/22* (2013.01); *H02K 2203/06* (2013.01)

(58) Field of Classification Search
CPC ...... H02K 5/10; G11B 5/012; G11B 19/2009; G11B 33/14
USPC ...................................................... 360/99.08
See application file for complete search history.

(56) References Cited

U.S. PATENT DOCUMENTS

| | | | | |
|---|---|---|---|---|
| 8,587,896 B1* | 11/2013 | Ishino | ............... | G11B 19/2009 |
| | | | | 310/71 |
| 9,166,452 B1* | 10/2015 | Endo | .................. | G11B 19/2009 |
| 2008/0212237 A1* | 9/2008 | Uefune | ............... | G11B 25/043 |
| | | | | 360/254 |
| 2008/0218010 A1* | 9/2008 | Hino | ...................... | H02K 3/522 |
| | | | | 310/71 |
| 2008/0310048 A1* | 12/2008 | Hirono | ............... | G11B 33/1466 |
| | | | | 360/97.16 |
| 2009/0195095 A1* | 8/2009 | Yawata | .................. | H02K 5/225 |
| | | | | 310/71 |
| 2011/0038076 A1* | 2/2011 | Hayakawa | ........... | G11B 25/043 |
| | | | | 360/97.16 |
| 2011/0216442 A1* | 9/2011 | Uchibori | ............... | G11B 17/02 |
| | | | | 360/99.08 |

(Continued)

FOREIGN PATENT DOCUMENTS

JP 2018-73444 A 5/2018

*Primary Examiner* — Allen T Cao
(74) *Attorney, Agent, or Firm* — Keating & Bennett (57) ABSTRACT

A motor of a disk drive includes a stationary portion, a bearing portion attached to the stationary portion, and a rotating portion supported by the stationary portion to be rotatable about a central axis through the bearing portion. The stationary portion includes a stator in which multiple coils annularly extend around the central axis, and a base portion located below the stator. The base portion is a portion of a housing that defines an internal space accommodating the rotating portion, the bearing portion, and the stator. The base portion includes a through hole that guides a lead drawn from the coil from the internal space of the housing to the outside. The through hole is filled with an adhesive, and includes an inclined hole that is inclined axially downward.

10 Claims, 7 Drawing Sheets

(56) References Cited

U.S. PATENT DOCUMENTS

| | | | | |
|---|---|---|---|---|
| 2012/0182645 A1* | 7/2012 | Kurokawa | ......... | G11B 19/2009 360/99.08 |
| 2013/0342934 A1* | 12/2013 | Shiraishi | ................. | H02K 5/16 360/99.08 |
| 2015/0138670 A1* | 5/2015 | Sato | ........................ | H02K 3/50 360/99.08 |
| 2018/0174610 A1* | 6/2018 | Shimomura | ............. | H02K 3/50 |

* cited by examiner

MOTOR AND DISK DRIVE

CROSS REFERENCE TO RELATED APPLICATION

The present disclosure claims priority under 35 U.S.C. § 119 to Japanese Application No. 2018-181410 filed on Sep. 27, 2018, the entire contents of which are incorporated herein by reference.

FIELD OF THE INVENTION

The present disclosure relates to a motor and a disk drive.

BACKGROUND

Conventionally, a disk drive such as a hard disk drive has been known. A motor for rotating a disk is installed in a disk drive. A motor installed in a conventional disk drive has an inner peripheral surface of a through hole of a base plate that comes into contact with a conducting wire inserted into the through hole. Since a sealing agent does not flow into this contact portion, airtightness of the hard disk drive filled with gas such as helium decreases.

In the conventional disk drive, if the through hole is short, even if the inner peripheral surface of the through hole does not come into contact with the conducting wire, gas such as helium having a low density may leak through the sealing agent.

SUMMARY

Example embodiments of the present disclosure are able to solve the above-mentioned problem with the conventional disk drive. A motor according to a first example embodiment of the present disclosure is a motor of a disk drive including a stationary portion, a bearing portion attached to the stationary portion, and a rotating portion supported by the stationary portion to be rotatable about a central axis through the bearing portion. The stationary portion includes a stator in which multiple coils are annularly arranged around the central axis, and a base portion located below the stator. The base portion is a portion of a housing that defines an internal space accommodating the rotating portion, the bearing portion, and the stator. The base portion includes a through hole that guides a lead drawn from the coil from the internal space of the housing to the outside, and the through hole is filled with an adhesive and includes an inclined hole that is inclined axially downward.

The above and other elements, features, steps, characteristics and advantages of the present disclosure will become more apparent from the following detailed description of the example embodiments with reference to the attached drawings.

DETAILED DESCRIPTION

Hereinafter, a first example embodiment of the present disclosure will be described with reference to the drawings. Note that in the present disclosure, a direction parallel to the central axis of a motor is referred to as an "axial direction", a direction orthogonal to the central axis of the motor is referred to as a "radial direction", and a direction extending along an arc about the central axis of the motor is referred to as a "circumferential direction". In addition, in the present disclosure, the shapes and positional relationships of parts will be described assuming that the axial direction is a vertical direction, and a stator side of a base portion is an upper side. Note, however, that the definition of the vertical direction is not intended to limit orientations of a motor and a disk drive of the present disclosure during use.

In addition, a "parallel direction" in the present disclosure includes a substantially parallel direction. In addition, an "orthogonal direction" in the present disclosure includes a substantially orthogonal direction.

Figure 1:
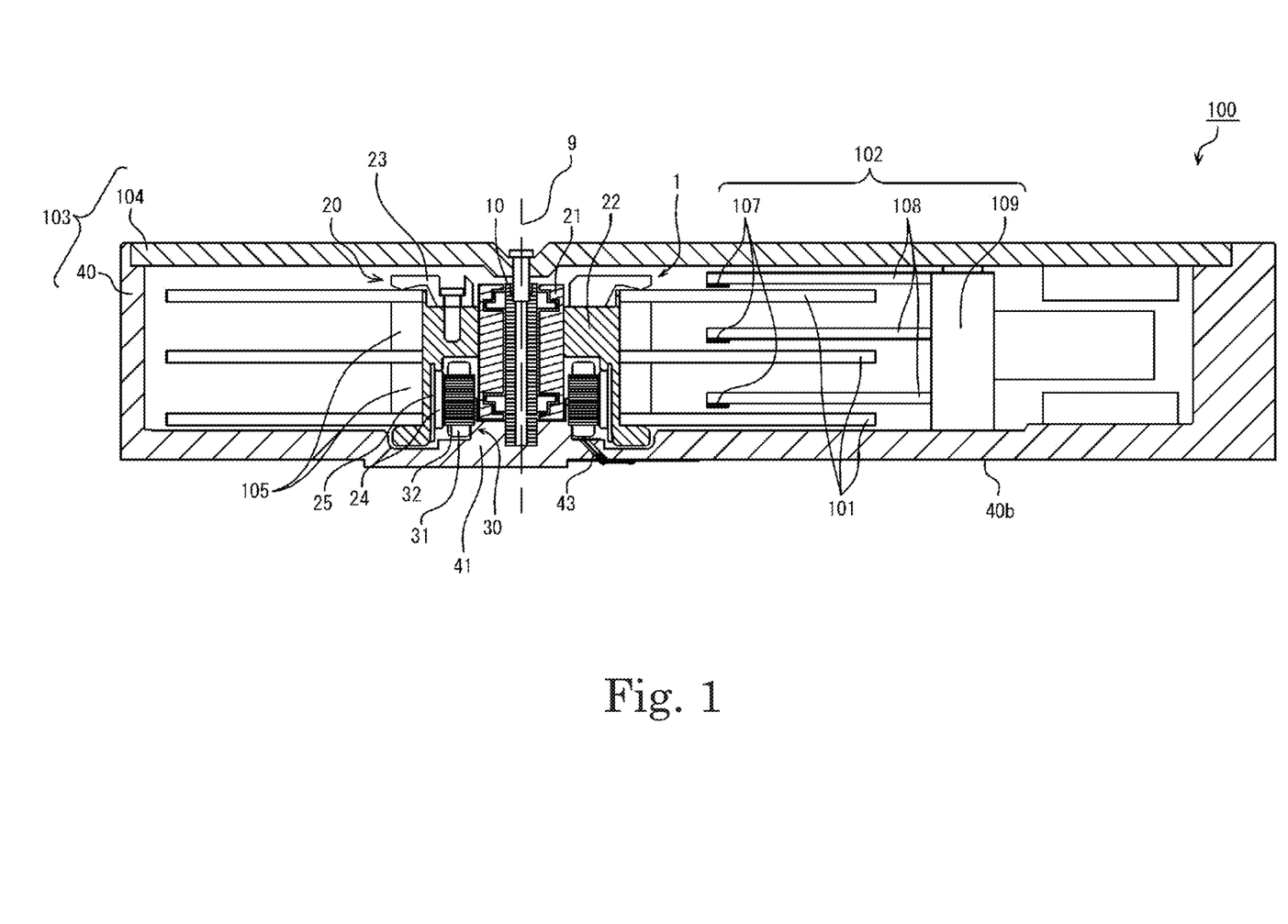
FIG. 1 is a cross-sectional view of a disk drive of a first example embodiment of the present disclosure.
Figure 2:
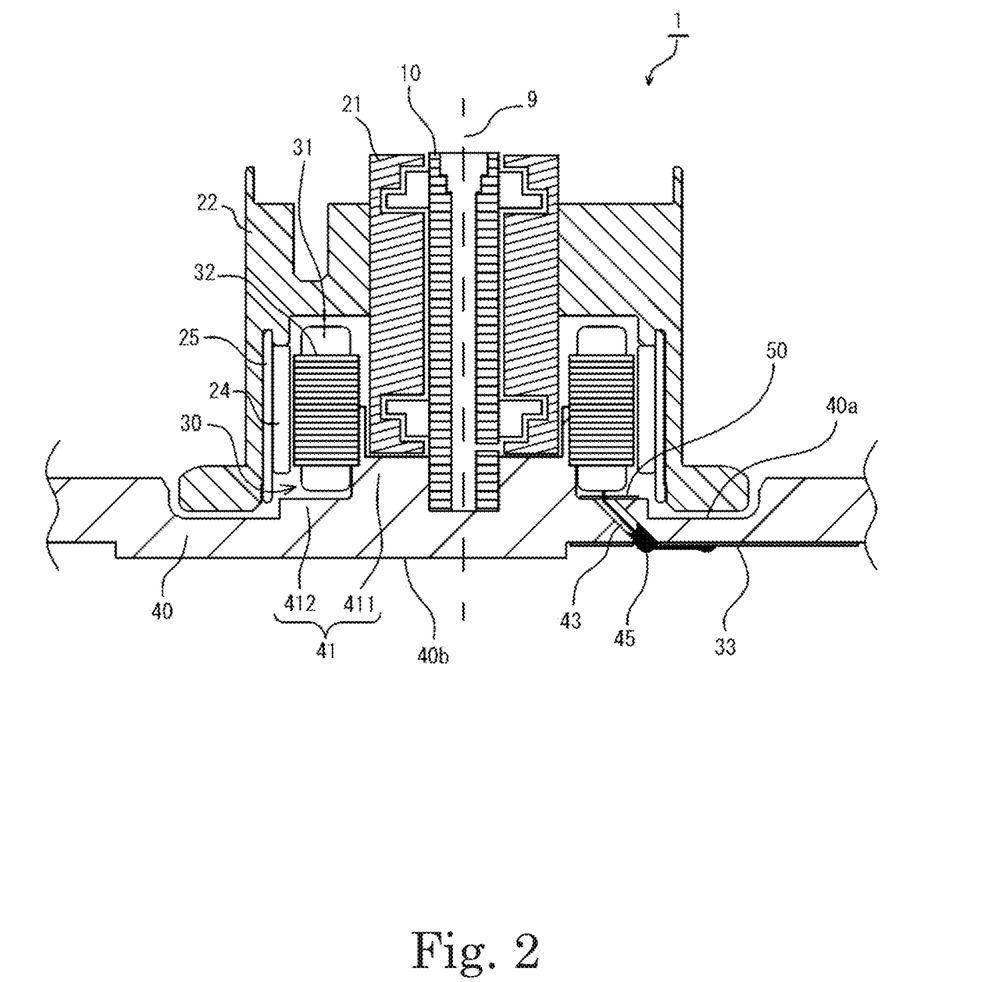
FIG. 2 is an enlarged cross-sectional view of a portion of a motor of FIG. 1.

FIG. 1 is a cross-sectional view of a disk drive 100 of a first exemplary example embodiment of the present disclosure. FIG. 2 is an enlarged cross-sectional view of a part of a motor 1 of FIG. 1.

The disk drive 100 is a hard disk drive. The disk drive 100 includes the motor 1, multiple (three in FIG. 1) disks 101, an access portion 102, and a housing 103 that accommodates these parts.

The housing 103 has a base portion 40 and a cover member 104. The base portion 40 is also a part of the motor 1 described later. The base portion 40 has an opening, and the cover member 104 is fitted to the opening to form the housing 103. An internal space of the housing 103 accommodates a shaft 10, a rotating portion 20, and a stator 30 of the motor 1 described later. That is, the base portion 40 is a part of the housing 103 forming an internal space for housing the rotating portion 20 described later, a bearing portion attached to a stationary portion described later, and the stator 30. The base portion 40 and the cover member 104 are combined in such a manner that the airtightness in the housing 103 is not lost. The internal space of the housing 103 is filled with a gas having a density lower than that of air, such as helium gas. Note that the internal space of the housing 103 may be filled with hydrogen gas, air or the like.

The multiple disks 101 are media in which information is recorded. The multiple disks 101 are stacked along a vertically extending central axis 9, spacers 105 are disposed therebetween. The multiple disks 101 are supported by a motor 1 described later. The multiple disks 101 are rotated about the central axis 9 by the motor 1.

The access portion 102 has a head 107, an arm 108, and a head moving mechanism 109. The head 107 approaches the surface of the disk 101 to magnetically perform at least one of reading information recorded in the disk 101 and writing information into the disk 101. The head 107 is supported by the arm 108. The arm 108 is supported by the head moving mechanism 109.

The motor 1 is a motor for a disk drive. The motor 1 has the shaft 10, the rotating portion 20, the stator 30, and the base portion 40. The motor 1 of each of the example embodiments of the present disclosure is a three-phase motor. The stator 30 and the housing 103 including the base portion 40 form a "stationary portion" of each example embodiment of the present disclosure.

The shaft 10 is a substantially cylindrical member disposed along the central axis 9. The shaft 10 supports the rotating portion 20 so as to be rotatable about the central axis 9. The shaft 10 is formed of a metal such as stainless steel, for example. An upper end portion of the shaft 10 is fixed to the cover member 104 of the housing 103 through a screw. A lower end portion of the shaft 10 is fixed to the base portion 40.

The rotating portion 20 includes a sleeve 21, a rotor hub 22, a clamp member 23, a magnet 24, and a yoke 25. The rotating portion 20 is supported to the stationary portion so as to be rotatable about the central axis 9, through the bearing portion.

The sleeve 21 is supported so as to be rotatable about the central axis 9. The sleeve 21 is disposed around the shaft 10, and faces the shaft 10 with a gap interposed therebetween. The gap is filled with a fluid such as lubricating oil or gas. In each of the example embodiments of the present disclosure, a bearing portion is formed by an outer peripheral surface of the shaft 10, an inner peripheral surface of the sleeve 21 and the fluid interposed therebetween.

The rotor hub 22 has a cylindrical shape. The rotor hub 22 is supported by the sleeve 21. The rotor hub 22 rotates about the central axis 9 together with the sleeve 21. The sleeve 21 and the rotor hub 22 may be formed as a single member, or may be separate members. A metal such as an aluminum alloy or ferromagnetic stainless steel is used as the material of the sleeve 21 and the rotor hub 22, for example.

The clamp member 23 is supported by the rotor hub 22. The clamp member 23 supports the multiple disks 101 between the clamp member 23 and the rotor hub 22. Thus, the multiple disks 101 are supported by the rotating portion 20 and rotate about the central axis 9.

The magnet 24 is fixed to an inner peripheral surface of the rotor hub 22 through the yoke 25. The magnet 24 has an annular shape centering on the central axis 9. An inner peripheral surface of the magnet 24 is a pole face in which N and S poles are alternately arranged along the circumferential direction.

The stator 30 is disposed radially inward from the rotor hub 22, and faces the magnet 24 with a gap interposed therebetween. The stator 30 generates a torque for rotating the rotating portion 20. The stator 30 has multiple coils 31 and a stator core 32. The stator core 32 is a laminated structure in which multiple annular magnetic bodies centered on the central axis 9 are laminated, and is fixed to the base portion 40. The stator core 32 has multiple teeth projecting radially outward. The multiple coils 31 are wound around the multiple teeth, and are arranged annularly around the central axis 9. The multiple coils 31 are formed of coil groups including three phases which are a U phase, a V phase and a W phase. Each coil group has one lead 33 from each phase. In addition, each coil group is formed of one conducting wire.

The base portion 40 is molded by casting, for example. The base portion 40 is an aluminum die cast. The base portion 40 has an upper surface 40a and a lower surface 40b. The upper surface 40a is a surface facing the inside of the housing 103. The lower surface 40b is a surface facing the outside of the housing 103.

Figure 3:
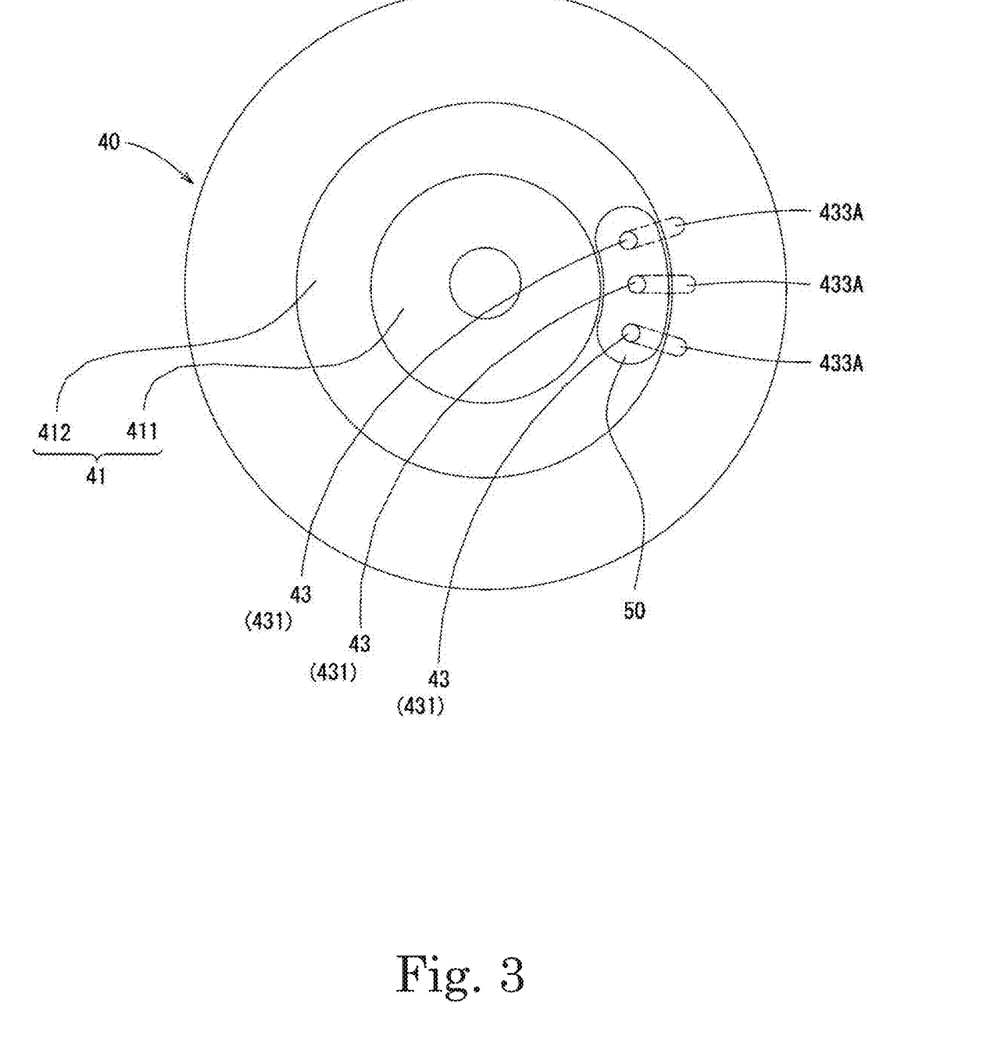
FIG. 3 is a plan view of a base portion of FIG. 1 as viewed from above.
Figure 4A:
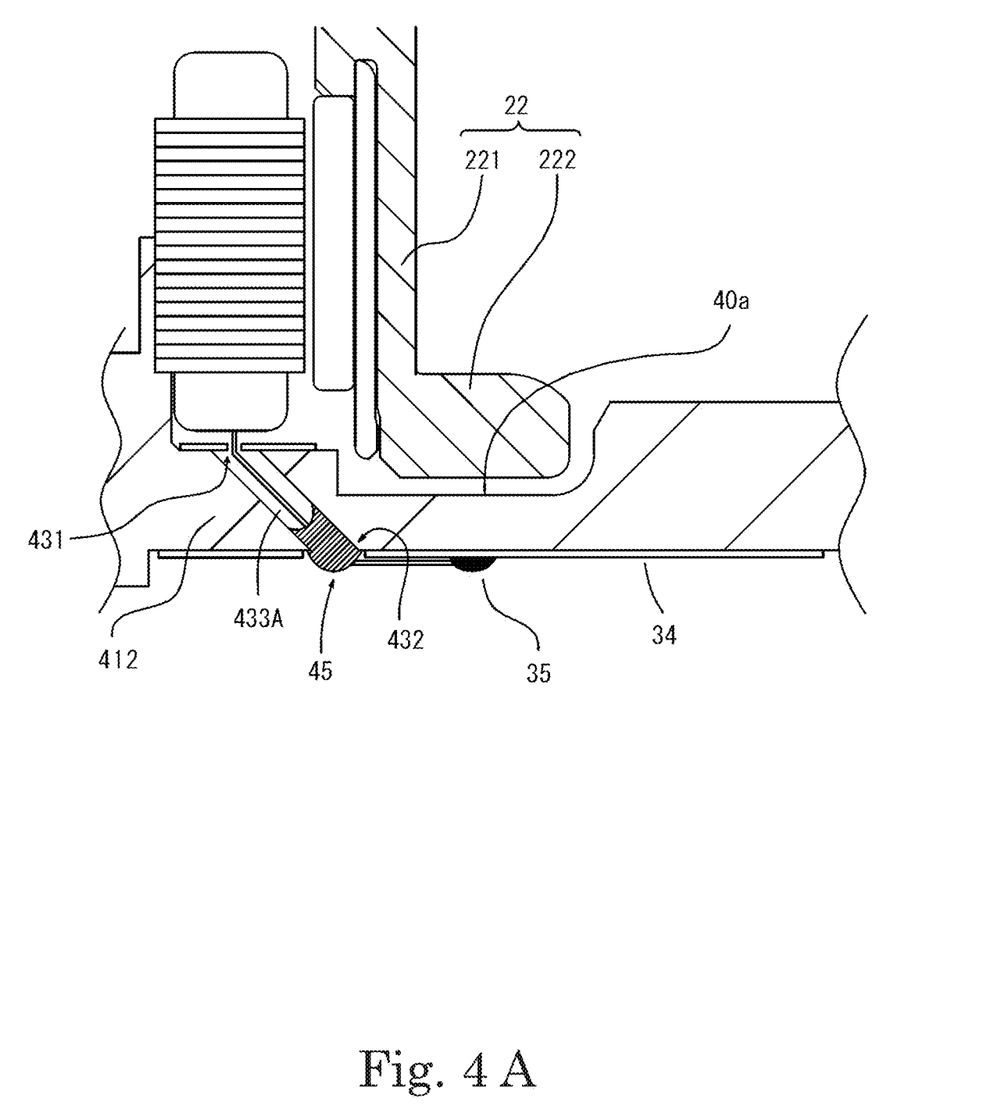
FIG. 4A is an enlarged view of the vicinity of a through hole of FIG. 1.
Figure 4B:
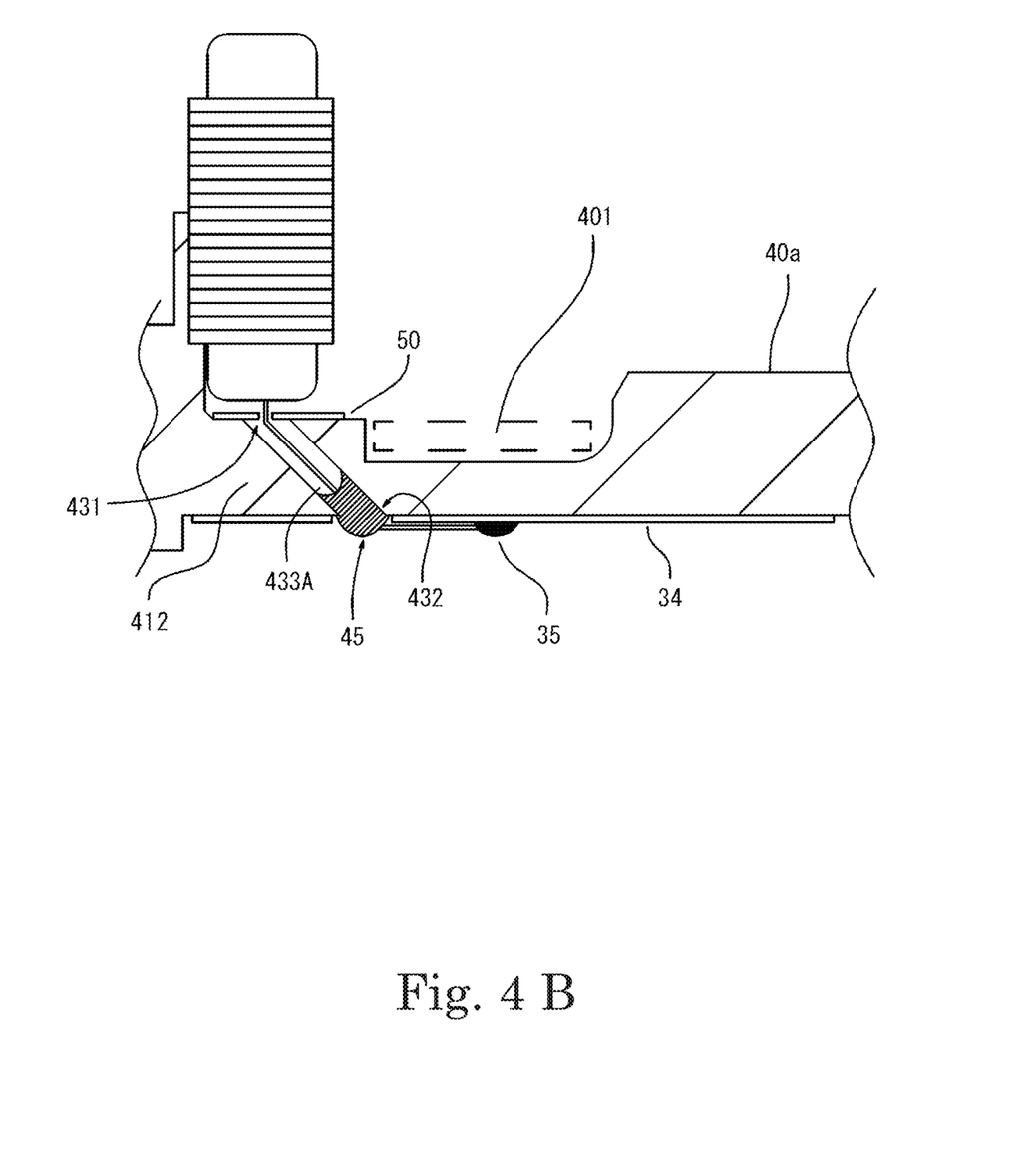
FIG. 4B is an enlarged view of the vicinity of the through hole of FIG. 1.

FIG. 3 is a plan view of the base portion 40 as viewed from the upper surface 40a side. FIGS. 4A and 4B are enlarged views of the vicinity of a through hole 43 of FIG. 1. Hereinafter, the base portion 40 will be described with reference to FIGS. 1 to 3, 4A, and 4B.

The base portion 40 has a protrusion 41 protruding upward from the upper surface 40a. The protrusion 41 has a first protrusion 411 and a second protrusion 412. The first protrusion 411 fixes the shaft 10 on the outer peripheral surface of the shaft 10. In addition, an outer peripheral surface of the first protrusion 411 supports the stator core 32 of the stator 30. The second protrusion 412 is provided on the outer peripheral surface of the first protrusion 411. The second protrusion 412 has a lower height in the vertical direction than the first protrusion 411. The stator 30 supported by the first protrusion 411 is disposed above the second protrusion 412.

As shown in FIG. 3, the second protrusion 412 is provided with three through holes 43 extending in the vertical direction. That is, the base portion 40 has three through holes 43. Note that a portion adjacent to the through hole 43 and indicated by a broken line is an inclined hole 433A described later. The through hole 43 connects the internal space of the housing 103 and the external space. The three through holes 43 are provided along the circumferential direction. The coil 31 has three leads 33 for supplying current of each phase of the three-phase alternating current. One lead 33 is inserted into one through hole 43. That is, one of the three leads 33 is passed through each of the three through holes 43. Since it is unnecessary to ensure a needlessly large circumferential width of the second protrusion 412, this is effective in downsizing the motor 1. Further, the three leads 33 can be easily drawn from the three through holes 43. Note that he lead 33 passes through the through hole 43 and is electrically connected to a wiring substrate 34 disposed on the lower surface 40b of the base portion 40 by a solder 35. That is, the base portion 40 has the through hole 43 that guides the lead 33 drawn from the coil 31 from the internal space of the housing 103 to the outside.

The through hole 43 is filled with an adhesive 45 which is a filling member. The adhesive 45 is an insulating adhesive. The through hole 43 is closed by the adhesive 45, and the internal space of the housing 103 is enclosed. The adhesive 45 is filled from the lower surface 40b side of the base portion 40. More specifically, with the lead 33 drawn from the through hole 43, the liquid adhesive 45 is filled from the lower surface 40b side of the base portion 40, and is cured. Accordingly, at least a lower opening 432 described later of the through hole 43 is covered with the adhesive 45. Further, at least a part of the adhesive 45 fills the inside of the through hole 43.

Here, it is preferable that the through hole 43 be longer. When the length of the through hole 43 is increased, the distance between the internal space of the housing 103 and the external space is increased, so that the gas enclosed in the internal space of the housing 103 is unlikely to leak to the external space. That is, airtightness of the internal space of the housing 103 can be ensured. For this reason, the second protrusion 412 is provided on the upper surface 40a of the base portion 40, and the through hole 43 is provided in the second protrusion 412. Thus, the length of the through hole 43 in the vertical direction can be increased. Furthermore, the through hole 43 has the inclined hole 433A extending radially outward toward the axially lower side. When the inclined hole 433A extends radially outward, the inclined hole 433A can be easily connected to the wiring substrate 34 on the extension line thereof. Further, on the premise that the thickness of the second protrusion 412 is constant, the through hole 43 having the inclined hole 433A is longer than a through hole that does not have the inclined hole 433A.

That is, in the present disclosure, the gas enclosed in the internal space of the housing 103 is unlikely to leak to the external space. Hence, airtightness of the internal space of the housing 103 can be ensured.

An upper surface of the second protrusion 412 is a surface facing the stator 30 in the vertical direction. As shown in FIG. 3, an insulating sheet 50 is provided on the upper surface of the second protrusion 412. In addition, the insulating sheet 50 has a size that covers at least the openings of the three through holes 43. Note, however, that each of the three through holes 43 may be covered with different insulating sheets 50.

As shown in FIGS. 4A and 4B, the through hole 43 has an upper opening 431 opened to the internal space of the housing 103 and a lower opening 432 opened to the space outside the housing 103. The insulating sheet 50 is placed on the upper opening 431 of the through hole 43 and closes the through hole 43. The insulating sheet 50 is provided with an unillustrated hole in a position overlapping a substantially central portion of the upper opening 431. The lead 33 passes through the through hole 43 through this hole, and is drawn to the lower surface 40b of the base portion 40. The insulating sheet 50 is an insulating material provided to position the lead 33 with respect to the through hole 43 and prevent contact between the lead 33 and an inner wall of the through hole 43.

Here, as shown in FIGS. 4A and 4B, in axial view, the upper opening 431 and the lower opening 432 do not overlap. That is, in axial view, the through hole 43 is longer in a case where the upper opening 431 and the lower opening 432 do not overlap, as compared with a case where the openings overlap. That is, in the present disclosure, the gas enclosed in the internal space of the housing 103 is unlikely to leak to the external space. Hence, airtightness of the internal space of the housing 103 can be ensured. Note, however, that a part of the upper opening 431 and a part of the lower opening 432 may overlap. In other words, in axial view, the through hole 43 is longer in a case where a part of the upper opening 431 and a part of the lower opening 432 overlap, as compared with a case where one of the upper opening 431 and the lower opening 432 completely overlaps the other. That is, in this example embodiment, too, the gas enclosed in the internal space of the housing 103 is unlikely to leak to the external space. Hence, airtightness of the internal space of the housing 103 can be ensured. Furthermore, in this example embodiment, in axial view, the length of the through hole 43 is shorter and the inclination angle of the inclined hole 433A is smaller than the example embodiment where the upper opening 431 and the lower opening 432 do not overlap. Hence, the work of forming the through hole 43 (e.g., cutting with drill) can be performed easily.

Further, the rotor hub 22 has a side wall portion 221 that covers the radially outer side of the magnet 24 through the yoke 25, and a flange portion 222 that extends radially outward from the axial lower end of the side wall portion 221. Moreover, the base portion 40 has a recessed portion 401 indicated by a broken line in FIG. 4B and depressed axially downward on the radially outer side of the upper opening 431. That is, at least a part of the flange portion 222 is located in the recessed portion 401. Thus, the motor 1 can be thinned in the axial direction.

Figure 5:
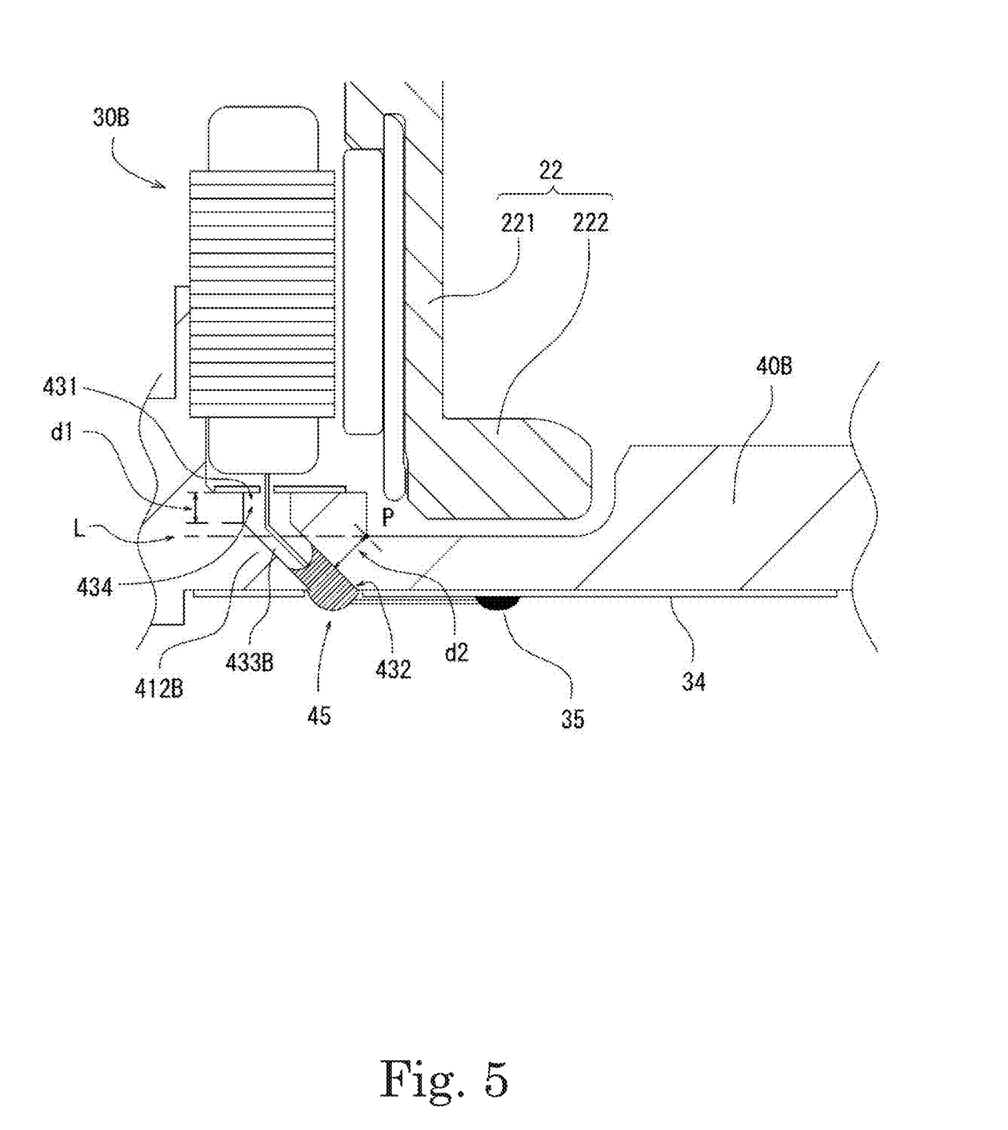
FIG. 5 is an enlarged cross-sectional view of a portion of a motor of a second example embodiment of the present disclosure.

Subsequently, a second example embodiment of the present disclosure will be described with reference to FIG. 5. FIG. 5 is an enlarged cross-sectional view of a part of a motor of the second example embodiment of the present disclosure. The second example embodiment is different from the first example embodiment in that a through hole 43 has an axially extending straight hole 434 axially above an inclined hole 433B. Note that for the sake of convenience, only portions different from the first example embodiment are denoted by reference numerals different from the first example embodiment.

As shown in FIG. 5, the straight hole 434 extends axially downward from an upper surface of a second protrusion 412 by a distance d1. Further, the axial lower end of the straight hole 434 and the upper end of the inclined hole 433B are connected. As a result, a wide distance can be ensured between the inclined hole 433B and an axially lowermost portion P of the second protrusion 412 on the radially outer side. That is, since a wide distance d2 shown in FIG. 5 can be ensured, rigidity of a base portion 40B can be ensured easily, and a motor that is not easily affected by vibration generated by a stator 30B can be provided.

Note that while an axially lowermost portion of the straight hole 434 is located axially above an axial position L of the axially lowermost portion P of the second protrusion 412 in FIG. 5, the axially lowermost portion of the straight hole 434 may be located axially below the axial position L. As a result, a wider distance can be ensured between the inclined hole and the axially lowermost portion of the second protrusion on the radially outer side. Hence, rigidity of the base portion can be ensured easily, and a motor that is not easily affected by vibration generated by the stator can be provided.

Figure 6:
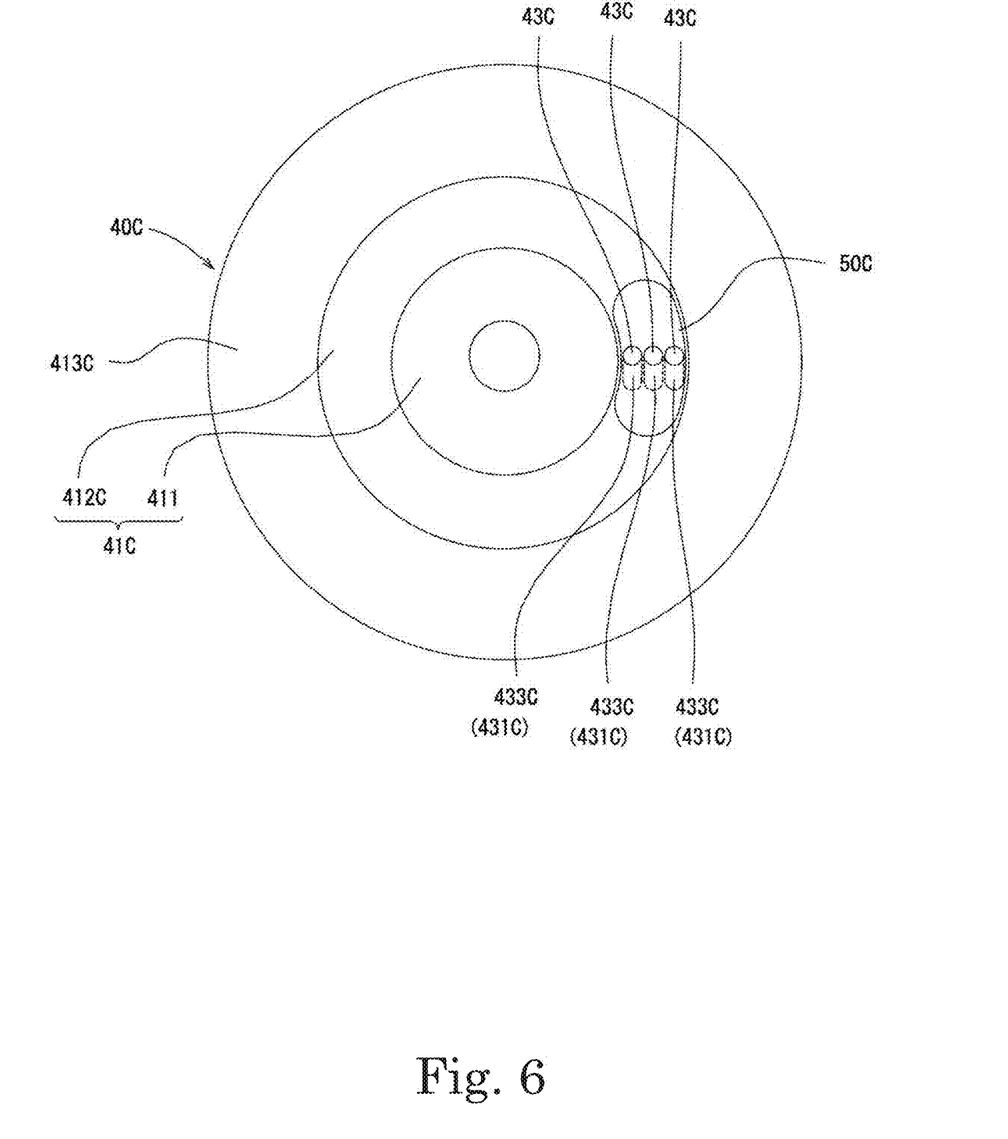
FIG. 6 is a plan view of a base portion of a third example embodiment of the present disclosure as viewed from above.

Subsequently, a third example embodiment of the present disclosure will be described with reference to FIG. 6. FIG. 6 is a plan view of a base portion of the third example embodiment of the present disclosure as viewed from above. The third example embodiment is different from the first example embodiment in the extending direction of an inclined hole 433C and the arrangement of through holes 43C. Note that for the sake of convenience, only portions different from the first example embodiment are denoted by reference numerals different from the first example embodiment.

As shown in FIG. 6, the three through holes 43C extending in the vertical direction are provided in a second protrusion 412C. That is, a base portion 40C has three through holes 43C, and the three through holes 43C are provided along the radial direction. Note that the through hole 43C has an upper opening 431C opened to an internal space of a housing 103. A coil 31 has three leads 33 for supplying current of each phase of the three-phase alternating current. One lead 33 is inserted into one through hole 43C. That is, one of the three leads 33 is passed through each of the three through holes 43C. Further, a portion adjacent to the through hole 43C and indicated by a broken line is the inclined hole 433C. The inclined hole 433C extends axially downward in the circumferential direction. More specifically, in axial view, the axial lower end of the inclined hole 433C overlaps the second protrusion 412C and does not overlap a portion 413 located radially outward from the second protrusion 412C. That is, the inclined hole 433C is provided in the second protrusion 412C which is thicker in the axial direction than the aforementioned portion 413. As a result, rigidity of the base portion 40C can be ensured easily, and a motor that is not easily affected by vibration generated by the stator can be provided.

The present disclosure is applicable to a motor and a disk drive, for example.

Features of the above-described preferred example embodiments may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor of a disk drive, the motor comprising:
a stationary portion;
a bearing portion attached to the stationary portion; and
a rotating portion supported by the stationary portion to be rotatable about a central axis through the bearing portion; wherein
the stationary portion includes:
a stator in which a plurality of coils annularly extend around the central axis; and
a base portion located below the stator;
the base portion is a portion of a housing that defines an internal space accommodating the rotating portion, the bearing portion, and the stator;
the base portion includes a through hole that guides a lead drawn from the coil from the internal space of the housing to the outside;
the through hole is filled with an adhesive, and includes an inclined hole that is inclined axially downward;
the through hole includes an upper opening that opens into the internal space, and a lower opening that opens to a space outside of the base portion; and
a shortest total distance of the inclined hole between the upper opening and the lower opening is longer than a total axial distance between the upper opening and the lower opening.

2. The motor according to claim 1, wherein the inclined hole extends axially downward while extending in a radial direction.

3. The motor according to claim 1, wherein the inclined hole extends axially downward while extending in a circumferential direction.

4. The motor according to claim 1, wherein
the upper opening and the lower opening do not overlap in an axial view along the central axis.

5. The motor according to claim 2, wherein
the plurality of coils are defined by a coil group including three phases, the coil group including one lead from each of the three phases; and
the base portion includes three of the through holes, one of the leads being inserted into one of the through holes, and the three through holes being provided along the circumferential direction.

6. The motor according to claim 3, wherein
the plurality of coils are defined by a coil group including three phases, the coil group including one lead from each of the three phases; and
the base portion includes three of the through holes, one of the leads being inserted into one of the through holes, and the three through holes being provided along the radial direction.

7. The motor according to claim 2, wherein the through hole includes an axially extending straight hole positioned axially above the inclined hole.

8. The motor according to claim 1, wherein
the base portion includes a recessed portion depressed axially downward on a radially outer side of the upper opening;
the rotating portion includes a rotor hub that includes a magnet radially facing the stator;
the rotor hub includes a side wall portion that covers a radially outer side of the magnet, and a flange portion that extends radially outward from an axial lower end of the side wall portion; and
at least a portion of the flange portion is located in the recessed portion.

9. The motor according to claim 1, wherein
the base portion includes a protrusion protruding upward;
the protrusion includes a first protrusion, a second protrusion provided on an outer peripheral surface of the first protrusion, and a thinner portion located radially outward from the second protrusion and thinner in the axial direction than the second protrusion; and
the inclined hole is provided in the second protrusion and is not provided in the thinner portion.

10. A disk drive comprising:
the motor according to claim 1;
a disk supported by the rotating portion in the internal space of the housing; and
an access portion that perform one of reading information from the disk and writing information into the disk; wherein
the internal space is filled with a gas having a density lower than a density of air.

* * * * *